US005588476A

United States Patent [19]

Trethewey

[11] Patent Number: 5,588,476
[45] Date of Patent: *Dec. 31, 1996

[54] REMOVABLE WINDOW SHADE

[76] Inventor: Brig E. A. Trethewey, 4238 N. 68th Pl., Scottsdale, Ariz. 85251-2312

[*] Notice: The term of this patent shall not extend beyond the expiration date of Pat. No. 5,588,476.

[21] Appl. No.: 293,136

[22] Filed: Aug. 19, 1994

[51] Int. Cl.$^6$ ........................................ B60J 3/00
[52] U.S. Cl. .............................. 160/370.21; 160/DIG. 13; 248/205.8
[58] Field of Search .................... 160/370.21, DIG. 2, 160/DIG. 3, DIG. 13; 248/205.8, 362, 363; 296/97.7, 97.9

[56] References Cited

U.S. PATENT DOCUMENTS

| | | |
|---|---|---|
| 1,158,005 | 10/1915 | Richards, Jr. . |
| 1,883,791 | 10/1932 | Jewell . |
| 1,953,877 | 4/1934 | Chase . |
| 2,706,659 | 4/1955 | Landis ........................ 296/97 |
| 3,025,098 | 3/1962 | Andrews ..................... 296/97 |
| 3,338,293 | 8/1967 | Hohmann ................... 160/368 |
| 3,649,069 | 3/1972 | Zip ............................ 296/97 D |
| 4,109,957 | 8/1978 | Polizzi et al. .............. 296/95 C |
| 4,261,649 | 4/1981 | Richard ...................... 350/276 R |
| 4,406,246 | 9/1983 | DeMeyer et al. .......... 118/505 |
| 4,560,251 | 12/1985 | Murjahn ..................... 350/283 |
| 4,607,875 | 8/1986 | McGirr ....................... 296/97 C |
| 4,702,517 | 10/1987 | Maeda et al. ............. 296/214 |
| 4,736,980 | 4/1988 | Eubanks ..................... 296/97 D |
| 4,746,162 | 5/1988 | Maness ....................... 296/97 R |
| 4,842,322 | 6/1989 | Lu .............................. 296/97.7 |
| 4,872,721 | 10/1989 | Sniadach .................... 296/97.2 |
| 5,080,309 | 1/1992 | Ivins et al. ................ 248/205.8 |
| 5,087,005 | 2/1992 | Holoff et al. .............. 248/205.8 |
| 5,176,357 | 1/1993 | Hobart ....................... 248/683 |
| 5,201,913 | 4/1993 | Vliet .......................... 294/64.1 |
| 5,405,112 | 4/1995 | Trethewey ................. 248/205.8 |

Primary Examiner—David M. Purol
Attorney, Agent, or Firm—Cahill, Sutton & Thomas P.L.C.

[57] ABSTRACT

A removable window shade is secured adjacent a roll down vehicular window along the top edge by a pair of suction cups. At least one suction cup detachably secures the lower folded edge of the window shade to the window. The lower suction cup includes a pressure relief mechanism to permit facile detachment and reattachment between the suction cup and the window to permit displacement of the lower part of the window shade from the window prior to rolling down the window.

2 Claims, 3 Drawing Sheets

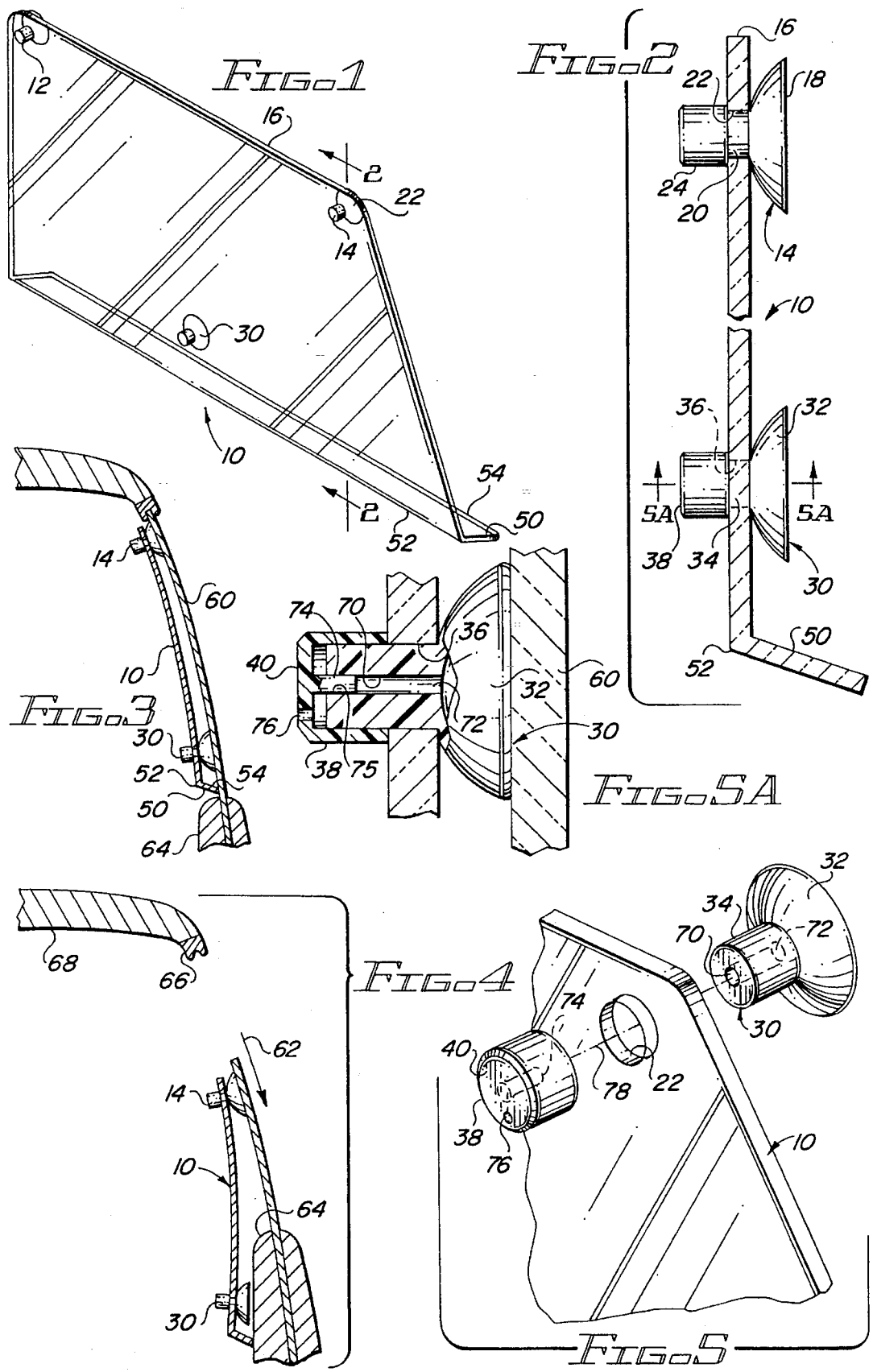

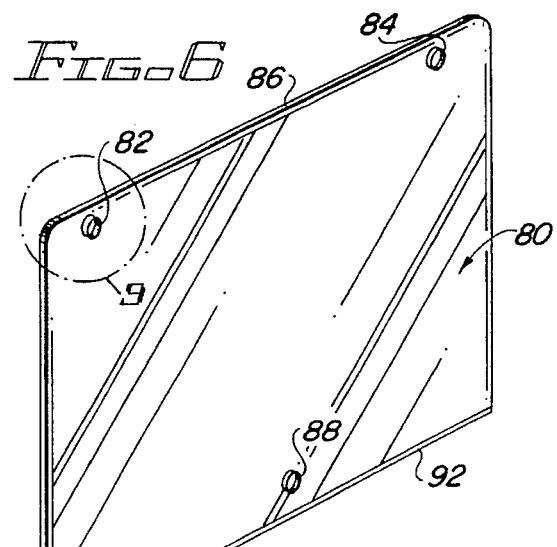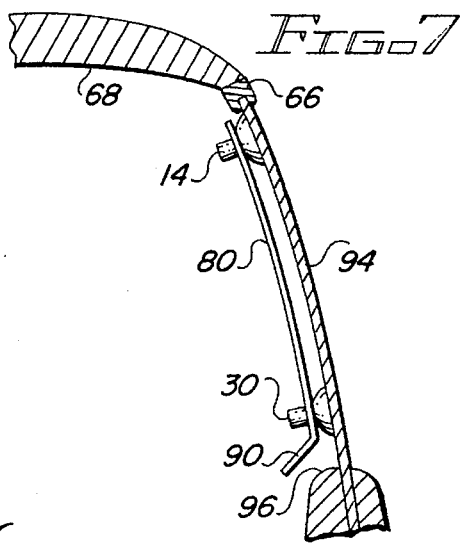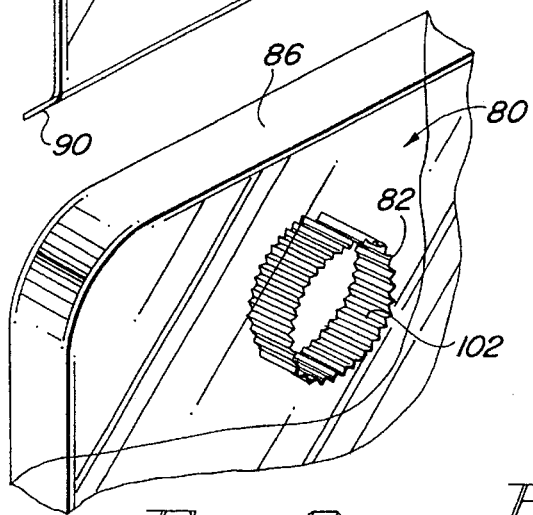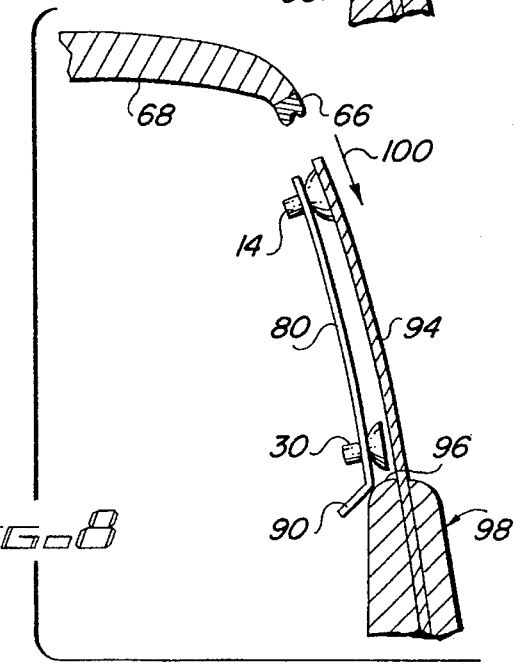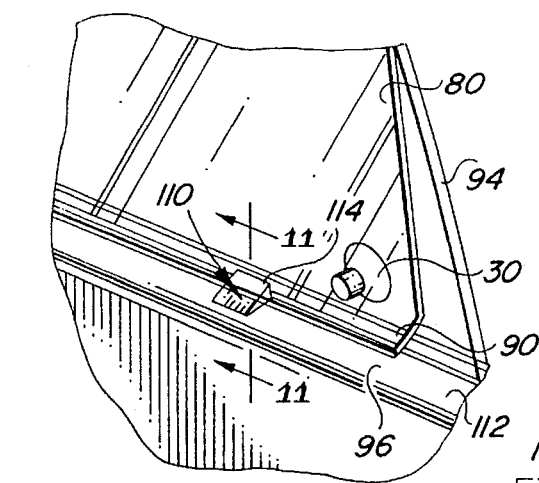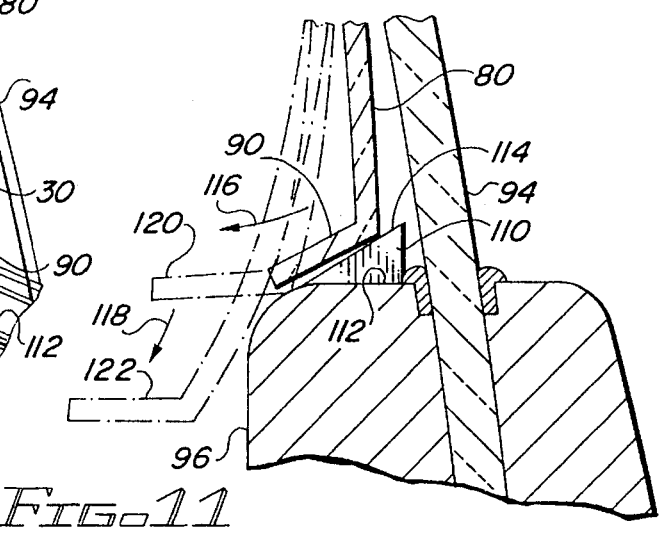

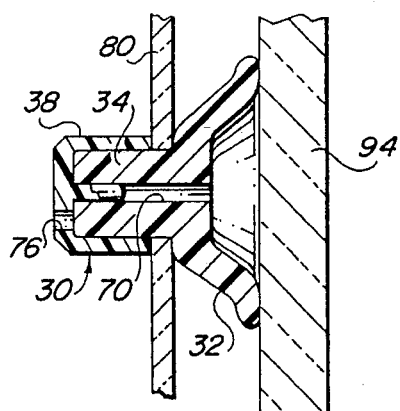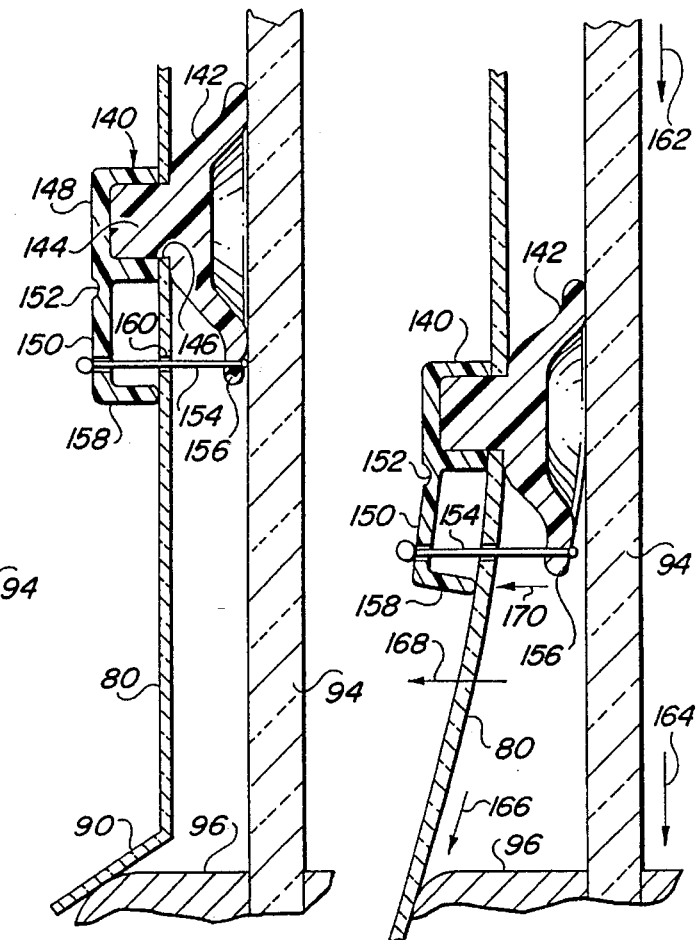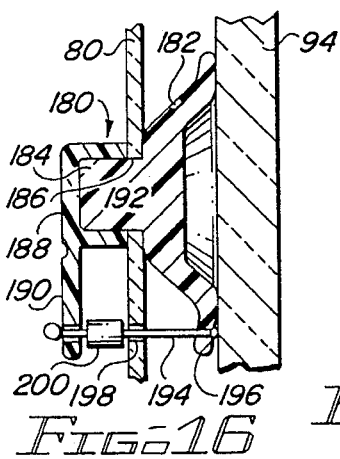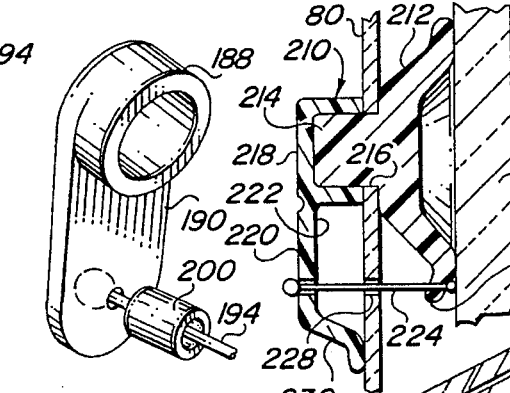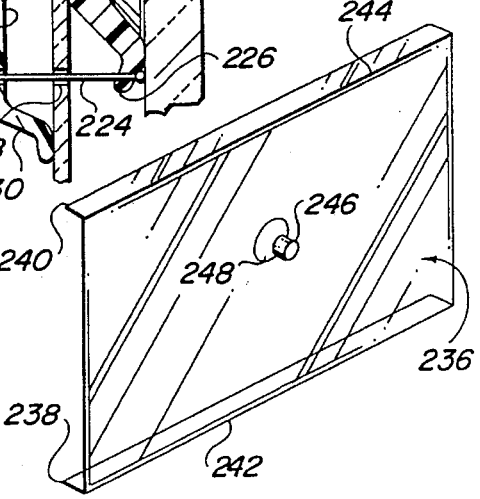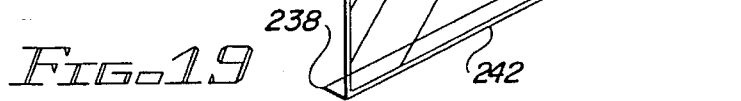

5,588,476

1

REMOVABLE WINDOW SHADE

BACKGROUND OF THE INVENTION

1. Field of the Invention

The present invention relates to window shades and, more particularly, to automotive window shades.

2. Description of Related Art

The windows for most automotive vehicles can be obtained tinted to reduce their transmisivity to ultra-violet light to avoid deterioration of the components of the interior of the vehicle that otherwise would result. The tinted glass also reduces solar radiation within the vehicle and will reduce the temperature to which the interior of the vehicle is heated. The reduced intensity of the solar radiation will also assist the occupants in seeing objects outside of the vehicle more clearly.

To avoid the expenses attendant tinting of the window glass, sheets of colored transparent film may be laminated to the interior surface of the windows of the vehicle to reduce transmission of solar radiation. After sunset, the tinted windows become a deterrent to good visibility of surrounding traffic and road conditions due to the reduced light transmisivity of the windows. The degree of hazard created is necessarily a function of the degree of tint or reduced light transmisivity present.

The permissible degree of window tinting varies from state to state. These laws can force an owner of a vehicle having too darkly tinted windows to remove the laminated tinted sheet. Thus, easily detachable tinted window shades are a definite boon to travel through states having laws permitting only moderately tinted windows.

To avoid the expenses attendant tinted windows and the problem attendant laminated films, temporarily attached colored transparent sheets of material have been attached to one or more of the windows. The temporary attachment of such devices permits their removal after sunset or during other low light conditions. However, such temporary shields embody various impediments to their continued use. First, the window generally can not be rolled down without removal of the shield. Second, removal of the shield is cumbersome or awkward. Third, even temporary removal requires storage or placement of the respective shields within the vehicle. Fourth, attachment mechanisms may have to be permanently installed in order to support the shields. Fifth, depending upon the attachment mechanisms, the shields may be relatively expensive.

SUMMARY OF THE INVENTION

A tinted rigid full window shade is supported upon a vehicular window by a pair of suction cups disposed along the top edge of the shade. The lower edge of the shade is maintained in position by one or more easily or automatically releasable suction cups disposed adjacent the lower edge. The releasable suction cup(s) may be readily released from the window to draw the lower edge away from the window sufficiently to permit the lower edge to clear the window sill upon lowering of the window. By adopting a mechanism to force the lower edge of the shade inwardly upon downward movement of the window, automatic release of the lower edge of the shade can be accomplished. After the window is raised, the lower suction cup(s) may be reattached to the window. A fold along the lower edge of the shade, turned inwardly or outwardly, maintains the shade sufficiently rigid to retain the shade in place against the window and to stabilize it during lowering of the window.

The primary object of the present invention is to provide a readily detachably attachable window shade for vehicular windows.

Another object of the present invention is to provide an inexpensive window shade for reducing transmission of solar radiation into the interior of the vehicle.

Yet another object of the present invention is to provide a vehicular window shade which readily accommodates lowering and raising of the window.

Still another object of the present invention is to provide a readily attachable and detachable vehicular window shade which is relatively rigid upon partial detachment.

A further object of the present invention is to provide a window shade for a vehicular window which is easily partly detachable to accommodate lowering of the window.

A yet further object of the present invention is to provide a detachably attachable window shade conforming with the full size of a window.

A still further object of the present invention is to provide a window shade which has a lower edge automatically detachable from the underlying window upon lowering of the window.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is an isometric view illustrating the window shade;

FIG. 2 is a cross sectional view taken along lines 2—2, as shown in FIG. 1;

FIG. 3 is partial cross sectional view illustrating mounting of the shade upon a vehicular window;

FIG. 4 illustrates partial detachment of the shade shown in FIG. 3 during lowering of the vehicular window;

FIGS. 5 and 5a illustrate the components of a releasable suction cup usable with the shade;

FIG. 6 illustrates a rectangular window shade;

FIG. 7 is a cross sectional view illustrating attachment of the window shade shown in FIG. 6 to a vehicular window;

FIG. 8 illustrates corresponding movement of a partially detached window shade upon lowering of the vehicular window;

FIG. 9 is a detail view taken within circle 9 shown in FIG. 6;

FIG. 10 illustrates a ramp disposed upon the vehicular window sill to guide movement of the window shade shown in FIG. 7 upon lowering of the vehicular window;

FIG. 11 is a cross sectional view taken along lines 11—11, as shown in FIG. 10;

FIG. 12 illustrates a releasable suction cup useable with the shade;

FIG. 13 illustrates operation of the releasable suction cup shown in FIG. 12;

FIG. 14 illustrates an automatically releasable suction cup for use at the lower edge of the shade;

FIG. 15 illustrates operation of the suction cup shown in FIG. 14;

FIG. 16 illustrates a variant of the releasable suction cup shown in FIG. 14;

FIG. 17 illustrates a detail of the suction cup shown in FIG. 16;

FIG. 18 illustrates a further variant of the releasable suction cup shown in FIG. 14; and FIG. 19 illustrates a further variant of the window shade.

DESCRIPTION OF THE PREFERRED EMBODIMENT

Referring to FIG. 1, there is illustrated a window shade 10 for use with vehicular windows to reduce solar radiation within the vehicle. The shade itself may be of various sheet materials having reduced transmisivity to solar radiation, whether in the visible light frequency spectrum or in the ultra-violet frequency spectrum or both. A sheet material found particularly useful is tinted polycarbonate film or sheet having a thickness in the range of 0.015 to 0.060 inches. Other sheet material, such as acrylic, polyester, polyvinyl, cellulose acetate, and polyolefin may be used. Clear polycarbonate or other sheet material may also be used in conjunction with a semi-metallic light filtering film or colored film laminated to one of the surfaces. In another embodiment, the polycarbonate film or other transparent sheet material may be coated with a coating of light filtering material. Preferably, the sheet material is polycarbonate of a 0.025" thickness having a 35% light transmittance.

As illustrated jointly in FIG. 1 and 2, a pair of suction cups 12, 14 are disposed adjacent upper edge 16 of the shade. Each of these suction cups includes a cup element 18 extending from a stem 20. The stem is penetrably inserted through aperture 22 formed in shade 10. A cap 24, being of a diameter larger than aperture 22, is secured to the portion of stem 20 extending beyond the surface of the shade. Thereby, the shade is retained intermediate cup element 18 and cap 24. Upon attachment of suction cups 12 and 14 to the upper part of a window of a vehicle, shade 10 will depend therefrom.

The lower edge of the shade is secured to the window by a further suction cup 30. Suction cup 30 includes a cup element 32 having a stem 34 extending therefrom. The stem is penetrable inserted through an aperture 36 formed in shade 10. A cap 38 is mounted upon the stem to retain shade 10 between the cap and cup element 32. To provide rigidity to shade 10, lower edge 50 is bent along fold line 52. The degree of bend may be in the range of 15° to 75° with the optional bend being 45°.

Referring jointly to FIG. 3 and 4, installation and operation of shade 10 will described in further detail. Window 60 may be a fixed non-openable window of a vehicle supported within a window frame in the conventional manner. Alternatively, it may be a window that can be lowered into a door panel or side wall of the vehicle. After cutting shade 10 to the general dimensions of window 60 and installing suction cups 12 and 14 at opposed ends along the upper edge, these suction cups are attached to the interior surface of the window, as represented by suction cup 14. The lower end of shade 10 is secured to window 60 by engaging suction cup 30 with the window. This will cause edge 54 of lower panel 50 to bear against the window and, in combination with fold line 52, render the shade relatively rigid.

If the window is of the type that can be lowered, as depicted in FIGS. 3 and 4, such lowering, as depicted by arrow 62 in FIG. 4, is accommodated without damage to shade 10 by releasing suction cup 30 from the window and drawing the lower edge of the window interior of inside door panel 64. As the window is lowered, the lower part of the shade will slide downwardly along the surface of the door panel. Should there be door handles, arm rests or other protrusions in the door panel, the lower edge of the shade is pulled inwardly to clear them. The resiliency of the stems of suction cups 12 and 14 will readily accommodate the requisite realignment of shade 10. After raising the window into engagement with weather stripping 66 of either the window frame or roof 68 of the vehicle, suction cup 30 is reattached to the window to maintain the shade firmly in place adjacent the window. During detachment of suction cup 30, the shade will remain relatively stiff due to folded panel 50 and yet easily accommodate bending to clear the inner door panel.

Detachment and reattachment of the lower edge of shade 10 is enhanced and rendered more facile if a suction cup having a release mechanism is used. Referring to FIGS. 5 and 5a, there is illustrated a suction cup 30 with a type of release mechanism adapted for the present invention. A passageway 70 extends from the center of the concave surface of cup element 32 to opening 72 at the end of stem 34. A stopper 74 extends from the interior of cap 38 into penetrable engagement with passageway 70 through opening 75 to seal the end of the passageway. End wall 40 of cap 38 includes an aperture 76. Upon axial displacement of cap 38 along axis 78 relative to stem 34 to a degree sufficient to permit stopper 74 to clear opening 75, there will be fluid communication between the space defined by the concave surface within cup element 32 and the ambient atmosphere through passageway 70, the interior of cap 38 and aperture 76. Such fluid communication will relieve the below ambient pressure present within the space defined by cup element 32 and the suction cup is readily pulled away from window 60. To reestablish the function of the suction cup for reattachment of shade 10, cap 38 is simply pressed fully onto stem 34 to force stopper 74 to seal passageway 70. It may be noted that suction cups 12 and 14, and not just suction cup 30, may be the quick release suction cups illustrated in FIGS. 5 and 5a.

FIG. 6 illustrates a rectangular window shade 80 having a pair of apertures 82, 84 disposed adjacent upper edge 86 for receiving suction cups, such as suction cups 12 and 14. One or more apertures 88 may be disposed adjacent the lower part of the shade to receive releasable suction cups, such as suction cup 30. As jointly illustrated in FIGS. 6, 7 and 8, panel 90 is folded out of the plane of shade 80 along fold line 92. The panel, after mounting as illustrated in FIGS. 7 and 8, extends away from the underlying automotive window 94. With such orientation, downward movement of the window will cause panel 90 to contact window sill 96 of door 98 and be deflected inwardly of the sill upon lowering of the window, as represented by arrow 100. The forced inward deflection will result in automatic release of suction cup 30. Such automatic release will come about in the following manner with reference to FIGS. 12 and 13. As the lower edge of shade 80 is forced away from window 94, the shade will be urged against cap 38. Upon sufficient urging force as depicted by arrow 104, the cap will translate axially along stem 34. The translated cap will expose the outlet 72 of passageway 70 and the vacuum adjacent the concave surface of the cup element 32 will be relieved through aperture 76 by inflow of air (depicted by arrow 106) in release of the suction cup. Alternatively, the releasable suction cup may be of one of the other types described in my copending patent application entitled "SUCTION CUP RELEASE ASSEMBLY" Docket No 4755-A-4, Ser. No 08/179,117, filed Jan. 10, 1994 and incorporated by reference herein.

For reasons set forth above with respect to shade 10 and suction cup 30, a releasable suction cup (30) extends through and is engaged with aperture 88 of shade 80. To eliminate the need for retaining caps 38 upon the stems of suction cups 12 and 14 penetrably extending through apertures 82 and 84, these apertures may be defined by a plurality of transversely oriented ridges 102 as shown in FIG. 9. These ridges, in totality, define the size of aperture 82 (and aperture 84) slightly less than the diameter of stem 34 extending from cup element 18 of suction cup 14 and the stem extending from the cup element of suction cup 12. Thereby, upon penetrable insertion of the respective stems of suction cups 12 and 14 through ridged apertures 82 and 84, respectively, the resulting frictional engagement between the stems and apertures will retain the suction cups in place without the need for caps.

As particularly illustrated in FIGS. 8, 10 and 11, panel 90 of shade 80, upon contacting sill 96, will be deflected interiorly of the sill to accommodate translation of the detached lower part of shade 80 adjacent the interior surface of the sill. For vehicles having very wide sills, as illustrated in FIGS. 10 and 11, such internal deflection may have to be augmented. By installing a ramp 110 upon surface 112 of sill 96, panel 90 will contact inclined surface 114 of the ramp and be deflected inwardly, as represented by arrow 116. The resulting inward and downward movement of the lower part of shade 80 upon lowering window 94 is reflected in dashed line cross sectional representations 120, 122 of panel 90 and the lower part of shade 80. As discussed above, such downward movement of window 94 and commensurate downward and inward movement of shade 80 requires that releasable suction cup 30 be disengaged from the window. The disengagement may be performed manually or automatically by simply lowering the window. Upon raising of window 94 to its upper most position, sill 96 will no longer interfere with reattachment of releasable suction cup 30 to the window. Thereafter shade 80 will remain attached to the window. It may be noted again that suction cups 12 and 14 need not be disengaged from the window to permit lowering of the window.

Referring jointly to FIGS. 14 and 15 a variant releasable suction cup 140 will be described for automatically releasing the lower edge of shade 80 from adjacent window 94. The suction cup includes a cup element 142 having a stem 144 extending therefrom. Shade 80 is penetrably mounted upon the stem through aperture 146. A cap 148 is lodged upon the protruding part of stem 144 to maintain shade 80 lodged intermediate the cap and cup element 142. An arm 150, which may include a specific hinge line 152, extends from cap 148. The arm supports a filament or leaver 154 interconnected with a tab 156 disposed at the perimeter of cup element 142. A foot 158 extends from arm 150 and rests against shade 80. Necessarily, shade 80 is apertured with an aperture 160 to accommodate pass through of leaver 154.

Upon lowering of window 94, as depicted by arrows 162, 164 shade 80 is translated downwardly to window sill 96 and upon contact by panel 90 with the window sill also inwardly, as described above and as illustrated by arrow 166. The inward movement of shade 80, reflected by arrow 168, will result in movement of the shade away from window 94 in proximity to foot 158, as depicted by arrow 170. The inward movement of the shade will force foot. 158 away from window 94 and result in bending of arm 150 at or about hinge line 152. The resulting arcuate translation of the arm will result in axial translation of leaver 154 in the direction indicated by arrow 170. Such translation of the leaver will result in a drawing of tab 156 away from window 94. When the tab is moved away from the window, the perimeter of cup element 142 will become disengaged with the window and the vacuum therein will be immediately relieved. With such relief, suction cup 140 will no longer retain shade 80 adjacent window 94. Thus, downward movement of window 94 with commensurate movement of shade 80 will result in automatic release of the lower part of the shade from the window.

Referring jointly to FIGS. 16 and 17, a variant of suction cup 40 will be described. Suction cup 180 includes a cup element 182 attachable in the conventional manner to window 94. A stem 184 extends from the cup element through aperture 186 in shade 80. A cap 188 is mounted upon the protruding part of the stem to retain the shade intermediate the cap and the cup element. Arm 190, which may include a hinge line 192, extends from cap 188 to support a leaver 194. The leaver interconnects the arm with a tab 196 disposed at the perimeter of cup element 182. Necessarily, shade 80 includes an aperture 198 to accommodate pass through of leaver 194. A cylinder 200 is disposed about leaver 194 intermediate arm 190 and shade 80.

Upon downward and inward movement of shade 80, as depicted in FIG. 15, the shade will bear against cylinder 200 and cause axial translation thereof. The translated cylinder will urge pivotal movement of leaver 190 about its hinge line 192. The resulting movement of the arm will cause axial translation of leaver 94 to draw tab 196 from 94. When tab 196 is withdrawn from the window, the vacuum within cup element 182 will be relieved and the suction cup becomes released from the window.

FIG. 18 illustrates a yet further variant of the releasable suction cup illustrated in FIGS. 14 and 15. A suction cup 210 includes a cup element 212 supporting a stem 214. The stem is in penetrable engagement with shade 80 through aperture 216. A cap 218 is mounted upon stem 214 to retain shade 80 intermediate the cap and cup element 212. An arm 220, which may include a hinge line 222, extends from cap 218 to support a leaver 224. The leaver is interconnected with a tab 226 disposed at the perimeter of cup element 212. Necessarily, an aperture 228 is disposed in shade 80 to accommodate pass through of leaver 224. A foot 230 extends from the end of arm 220 to a point adjacent shade 80.

When shade 80 is moved downwardly and inwardly upon lowering of window 94, as depicted in FIG. 15, the shade will force foot 230 inwardly. Such inward movement is translated into pivotal movement of arm 220 resulting to axial translation of leaver 224. The translation of the leaver draws tab 226 away from window 94 and lifts a part of the perimeter of cup element 212 from the window. The resulting immediate relief of the vacuum within the cup element will result in release of the cup element from the window.

FIG. 1 illustrates shade 10 configured to generally conform with the plan form of the window to which it is to be attached. Shade 80 depicted in FIG. 6 is generally rectangular to conform with or generally proximate the configuration of the window to which it is to be attached. Other sizes of the shade may be adopted to conform with specific or generalized requirements attendant the underlying window to which the shade is to become detachably attached.

As illustrated in FIG. 19 for a small sized shade, shade 236 incorporates a pair of opposed panels 238, 240 folded along fold lines 242, 244. A single aperture 246 centered within shade 236 supports a releasable suction cup 248, which suction cup may be of the type illustrated in FIGS. 5 and 5a. Through use of such a releasable suction cup, shade 236 may be relatively easily positioned about a window with minimal effort to either attach or detach the shade. The use of a pair of folded panels adds significantly to the rigidity of the shade and, upon attachment of suction cup 248, retains the opposed edges adjacent the underlying surface. The degree of force exerted by the shade against the window along the opposed paneled edges is sufficient to prevent fluttering or vibration due to an impinging wind or air flow. With the opposed edges being relatively stable, the opposed interconnecting edges will similarly tend not to vibrate or flutter. It is to be noted that shade 236 is readily usable upon curved windshields when panels 238, 240 are aligned radially with the curved underlying surface.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A window shade for use with a roll down window of a vehicle, said shade comprising in combination:

a) a flexible, resilient, self-supporting sheet of solar radiation filtering material generally conforming in planform with the window;

b) at least one upper suction cup for securing the upper edge of said sheet adjacent the upper part of the window;

c) a lower suction cup for securing the lower edge of said sheet adjacent the lower part of the window;

d) an automatic release mechanism for detaching said lower suction cup from the window to permit displacement of the lower part of said sheet from the window to accommodate lowering of the window;

e) a folded lower edge of said sheet for stiffening the lower part of said sheet; and f) means for deflecting said folded lower edge of said sheet away from the window upon lowering of the window.

2. A window shade for use with a roll down window of a vehicle, said shade comprising in combination:

a) a flexible, resilient, self-supporting sheet of solar radiation filtering material generally conforming in planform with the window;

b) at least one upper suction cup for securing the upper edge of said sheet adjacent the upper part of the window;

c) a lower suction cup for securing the lower edge of said sheet adjacent the lower part of the window;

d) an automatic release mechanism for detaching said lower suction cup from the window to permit displacement of the lower part of said sheet from the window to accommodate lowering of the window;

e) a folded lower edge of said sheet for stiffening the lower part of said sheet; and f) means for deflecting said folded lower edge of said sheet away from the window upon lowering of the window.

\* \* \* \* \*